United States Patent [19]

Imaizumi

[11] Patent Number: 4,503,951

[45] Date of Patent: Mar. 12, 1985

[54] HYDRAULIC DAMPER HAVING VARIABLE DAMPING DEVICE

[75] Inventor: Tomio Imaizumi, Kanagawa, Japan

[73] Assignee: Tokico Ltd., Kanagawa, Japan

[21] Appl. No.: 500,234

[22] Filed: Jun. 1, 1983

[30] Foreign Application Priority Data

Jun. 18, 1982 [JP] Japan ............................... 57-105200

[51] Int. Cl.³ .............................................. F16F 9/348
[52] U.S. Cl. .................................... 188/280; 188/317; 188/322.15; 267/64.15
[58] Field of Search ............... 188/280, 316, 317, 318, 188/319, 320, 322.13, 322.14, 322.15; 267/64.15

[56] References Cited

U.S. PATENT DOCUMENTS

| 1,616,091 | 2/1927 | Scott | 188/317 |
| 2,346,275 | 4/1944 | Read et al. | 188/317 X |
| 2,774,446 | 12/1956 | de Carbon | 188/317 X |

FOREIGN PATENT DOCUMENTS

| 2144 | 5/1979 | European Pat. Off. | 188/317 |
| 946758 | 2/1956 | Fed. Rep. of Germany | 188/320 |
| 1419551 | 10/1965 | France | 188/317 |
| 1092642 | 11/1967 | United Kingdom | 188/322.15 |
| 2090947 | 7/1982 | United Kingdom | 188/322.15 |

*Primary Examiner*—Douglas C. Butler
*Assistant Examiner*—Richard R. Diefendorf
*Attorney, Agent, or Firm*—Wenderoth, Lind & Ponack

[57] ABSTRACT

A hydraulic damper includes a cylinder containing hydraulic liquid, a piston slidable in the cylinder and partitioning the interior of the cylinder into two liquid chambers, a passage formed through the piston to communicate the two liquid chambers, a piston rod connected to the piston and extending out of the cylinder, and a valve for controlling the liquid flow in the passage. The piston is axially displaceable relative to the piston rod by a limited amount, and the valve comprises an annular disc mounted on the piston rod and cooperating with one side surface of the piston when the piston abuts with the disc when the piston displaces in one direction and separating from the piston to form a clearance therebetween which acts as an inlet of the passage when the piston displaces in the opposite direction.

5 Claims, 13 Drawing Figures

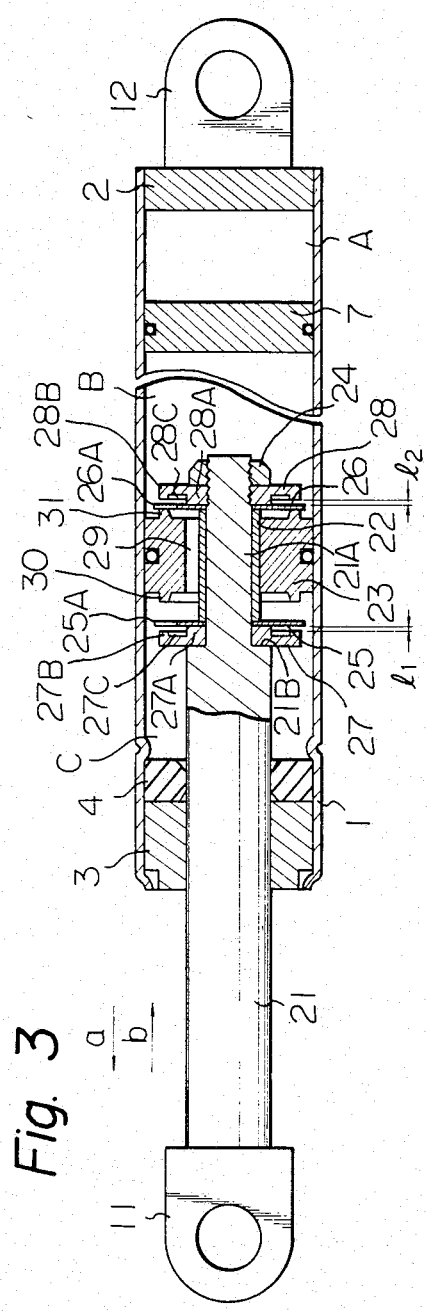
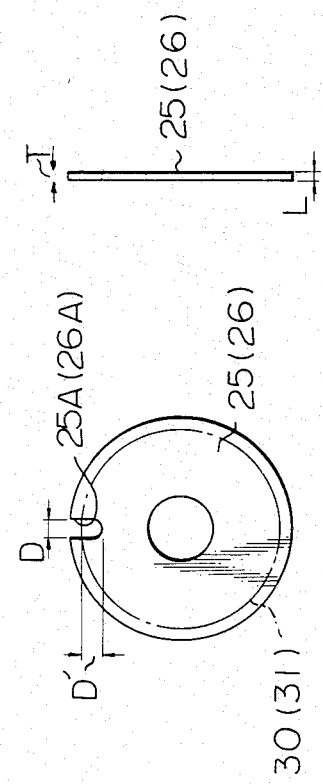
Fig. 3
Fig. 4A
Fig. 4B

HYDRAULIC DAMPER HAVING VARIABLE DAMPING DEVICE

BACKGROUND OF THE INVENTION

This invention relates to a hydraulic damper particularly adapted for use in a suspension system of such as an automotive vehicle. A conventional hydraulic damper comprises a cylinder, a piston slidably disposed in the cylinder and partitioning the interior of the cylinder into two liquid chambers, a piston rod connected to the cylinder and extending out of the cylinder through one end thereof, a device for generating damping force in the extension stroke of the damper and a device for generating damping force in the contraction stroke of the damper. Various types of damping force generating devices have been proposed to generate desired damping force in relation to the speed or the displacement of the piston in the cylinder.

SUMMARY OF THE INVENTION

An object of the invention is to provide a hydraulic damper having a novel damping force generating device and, according to the invention, there is provided a hydraulic damper comprising a cylinder, a piston slidably disposed in the cylinder and partitioning the interior of the cylinder into two liquid chambers, a passage extending through the piston to communicate the two liquid chambers both in the extension and contraction strokes of the damper, a piston rod extending through at least one of the two chambers to project out of the cylinder and being connected to the piston displaceably in the axial direction by a limited amount, and a device for controlling the liquid flow through the passage and comprising an annular resilient disc cooperating with one side surface of the piston when the piston displaces toward the disc.

BRIEF EXPLANATION OF THE DRAWINGS

The present invention will hereinafter be explained in detail with reference to attached drawings, in which:

FIG. 3 is a longitudinal sectional view of a hydraulic damper according to a first embodiment of the invention;

FIG. 4A is a plan view of an annular disc incorporated in the damper of FIG. 3;

FIG. 4B is a side view of the annular disc of FIG. 4A;

DETAILED EXPLANATION OF THE PREFERRED EMBODIMENTS

Figure 1:
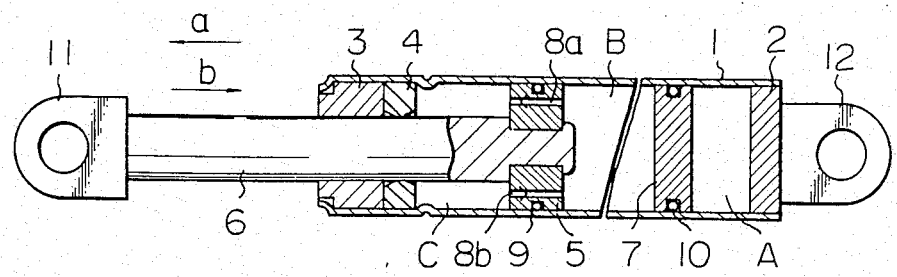
FIG. 1 is a longitudinal schematic sectional view of a typical prior art hydraulic damper.

FIG. 1 shows a typical prior art hydraulic damper which comprises a cylinder 1 with one end being closed by a cap 2 and the other end thereof being fitted with a rod guide 3 and a seal member 4. A piston 5 is slidably disposed in the cylinder 1, and a piston rod 6 is secured to the piston 5 and extends through the seal member 4 and the rod guide 3 to project out of the cylinder 1. A free piston 7 is slidably fitted in the cylinder 1 and between the cap 2 and the piston 5. There is defined in the cylinder 1 and between the cap 2 and the free piston 7 a gas chamber A for compensating the change in the volume in the cylinder 1 in response to the ingress and egress of the piston rod 6. The gas chamber contains therein a gas such as air or nitrogen gas under pressure. The piston 5 partitions the interior of the cylinder 1 between the free piston 7 and the seal member 4 into liquid chambers B and C which contain therein hydraulic liquid such as oil. There are provided in the piston 5 devices 8a and 8b for generating damping force of the damper. Shown at 9 and 10 are seal members provided respectively on the piston 5 and the free piston 7 and, at 11 and 12 are mounting brackets connected respectively to the projecting end of the piston rod 6 and the cap 2 for mounting the damper in such as a suspension system of a vehicle.

In operation, when an external force is applied on the piston rod 6 in the direction of arrow a, the piston rod 6 displaces, together with the piston 5, in the extending direction. The pressure in the liquid chamber C increases, a part of the liquid in the chamber C flows through the damping force generating device 8a to the liquid chamber B and the device 8a generates a damping force in the extension stroke of the damper. Conversely, when an external force is applied on the piston rod 6 in the direction of arrow b, the piston rod 6 displaces, together with the piston 5, in the contracting direction. A part of liquid in the liquid chamber B flows through the device 8b to the liquid chamber C. A damping force determined by the characteristics of the device 8b and the speed of the piston 5 is generated by the device 8b.

Various types of damping force generating devices have been proposed to match with desired damping force characteristics, but, there are discrepancies such that the construction of the piston is complicated, particularly when disc valves for generating the damping force are provided on respective side surfaces of the piston, and that it has been difficult to sufficiently reduce the damping force in the low speed range of the damper and to obtain a sufficiently large damping force in the high speed range, since the damping force in the low speed range has usually been determined by a fixed orifice permanently communicating the two liquid chambers and when the effective passage area of the fixed orifice is increased the damping force in the high speed range will be decreased.

An object of the invention is to provide a novel damping force generating device which is simple in construction, reliable in operation and can reduce sufficiently the damping force in the low speed range of the piston.

FIG. 3–FIG. 8 show a first embodiment of the invention wherein parts corresponding to FIG. 1 are depicted by the same reference numerals and detailed description therefor is omitted. Shown at 21 is a piston rod which has a small diameter portion 21A on the inner end thereof. A collar 22 is fitted on the small diameter portion 21A and, a piston 23 is slidably fitted on the collar 22. Annular resilient discs 25 and 26 and annular rigid restricting members 27 and 28 are respectively interposed between opposite ends of the collar 22 and a stepped portion 21B of the piston rod 21 and a nut 24 threaded on screw threads on the tip end of the small diameter portion 21A as shown. It will be understood that the inner diameters of annular discs 25 and 26 and restricting members 27 and 28 correspond to the small diameter portion 21A of the piston rod and the outer diameters thereof are less than the inner diameter of the cylinder 1. The piston 23 is slidable along the inner circumference of the cylinder 1 and, also, is slidable along the outer circumference of the collar 22 by a limited amount which is restricted by the restricting members 27 and 28 as described hereinafter. An axial passage 29 having a relatively large passage area is formed in the piston 23. In the illustrated embodiment, the passage 29 is integrally formed with the central bore fitting with the collar 22, but the passage 29 may be formed separately from the central bore of the piston. Annular projections 30 and 31 are formed on opposite side surfaces of the piston 23 to encircle the passage 29. The projections 30 and 31 are adapted to abut with the outer circumferential portions of the annular discs 25 and 26 respectively when the piston 23 moves on the collar 22 toward the restricting members 27 and 28 respectively.

As shown in FIGS. 4A and 4B, cut outs 25A and 26A are formed in annular discs 25 and 26 respectively to extend radially inwardly from the outer circumferences thereof. As shown in FIG. 4A, the cut out 25A or 26A has the width D and the radial length D' which is measured from the inner circumference of corresponding annular projection 30 or 31.

The restricting members 27 and 28 define on the inner circumferential portions facing the discs 25 and 26 axially elongated portions 27A and 28A respectively, on the outer circumferential portions relatively short portions 27B and 28B respectively, and on the intermediate portions annular grooves or recesses 27C and 28C respectively. The discs 25 and 26 are respectively clamped and located between opposite end surfaces of the collar 22 and the elongated portions 27A and 28A. Thus there are normally defined clearances $l_1$ and $l_2$ between the outer circumferential portions of discs 25 and 26 and the short portions 27B and 28B of the restricting members 27 and 28.

The operation of the hydraulic damper will hereinafter be explained.

Figure 5:
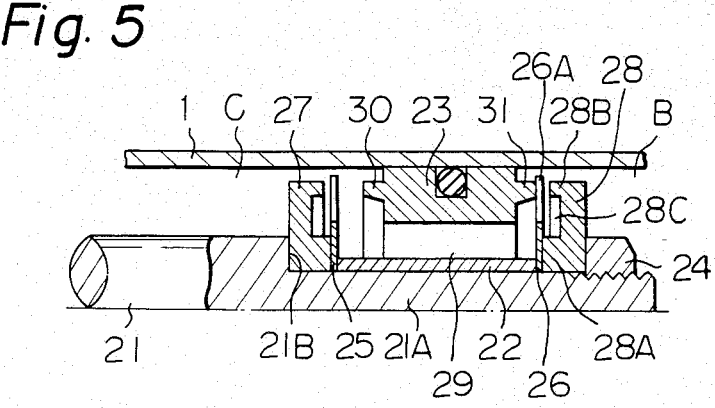
FIGS. 5, 6, 7 and 8 are enlarged partial half sectional views showing various operational conditions of the hydraulic damper of FIG. 3.

When an external force is applied on the piston rod 21 to displace the same in the direction of arrow a the extension stroke of the damper commences. The piston 23 is retained on the cylinder 1 due to the sliding resistance between the piston and the inner wall of the cylinder and, thus, slides on the piston rod 21, and the projecting portion 31 of the piston 23 abuts with the resilient disc 26 as shown in FIG. 5. Thereafter, the piston 23 also moves in the direction of arrow a, and the liquid in the liquid chamber C tends to flow into the liquid chamber B. The liquid flows through the passage 29 formed in the piston 23, a portion of the cut out 26A radially inwards of the inner circumference of the projecting portion 31 which has an effective passage area of the width D multiplied by the radial length D' (FIG. 4A), and an annular space defined between the disc 26 and the short portion 28B of the restricting member 28. The cut out 26A defines an orifice passage and the liquid flowing through the orifice passage generates a damping force, which is depicted by such as line OG in FIG. 2.

Figure 6:
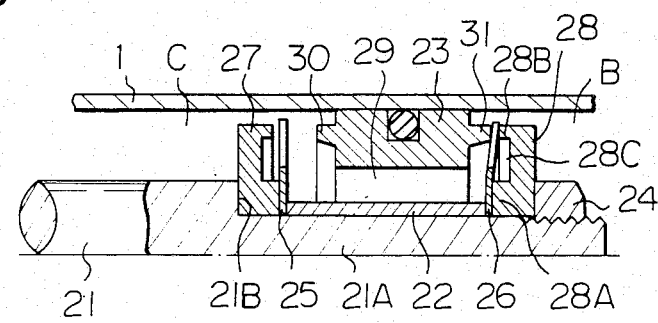

When the speed of the piston increases, the pressure in the liquid chamber C increases and the pressure difference between the chambers C and B increases accordingly. The piston 23 approaches the restricting member 28 with the resilient disc 26 being deflected. The annular clearance between the disc 26 and the restricting member 28 decreases gradually and, finally, the disc 26 abuts with the short portion 28B of the restricting member 28 as shown in FIG. 6. The liquid flow from the chamber C to the chamber B is restricted by an orifice passage having the effective area of the width D multiplied by the thickness T (FIG. 4B) of the disc 26. A relatively large damping force is generated, and is depicted by line GF in FIG. 2.

Figure 7:
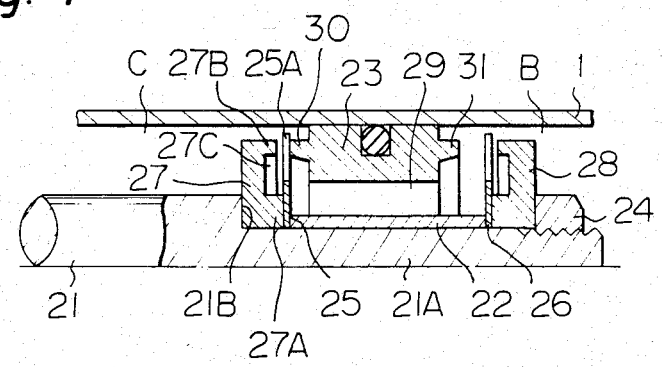

Conversely, when an external force acts on the piston rod 21 in the direction of arrow b or in the contracting direction, the piston 23 relatively displaces on the piston rod 21 and, firstly, takes the condition as shown in FIG. 7, with the projecting portion 30 abutting with the resilient disc 25. The liquid in the liquid chamber B flows into the liquid chamber C through the passage 29 in the piston 23, the cut out 25A in the disc 25, and an annular space defined between the disc 25 and the portion 27B of the restricting member 27. A portion of the cut out 25A defined by the inner circumference of the projecting portion 30 determines the effective area of orifice passage which acts to generate a damping force. The damping force is depicted by line OG' in FIG. 2.

Figure 8:
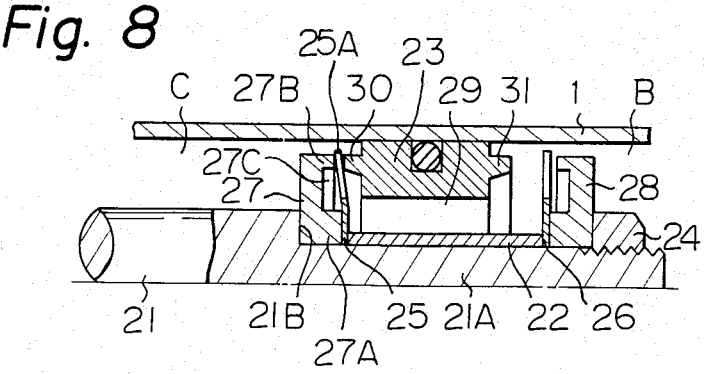

When the piston speed increases further, the pressure difference between the chambes B and C increases, and the resilient disc 25 is deflected. The annular clearance between the disc 25 and the portion 27B of the restricting member 27 gradually decreases to zero. The outer circumferential portion of the disc 25 is clamped between the portion 27B of the restricting member 27 and the projecting portion 30 of the piston 23, as shown in FIG. 8. The effective area of the orifice passage is defined by the thickness T of the disc 25 multiplied by the width D of the cut out 25A. A relatively large damping force is generated by the liquid flow passing through the orifice passage and is depicted by line G'F' in FIG. 2.

Figure 2:
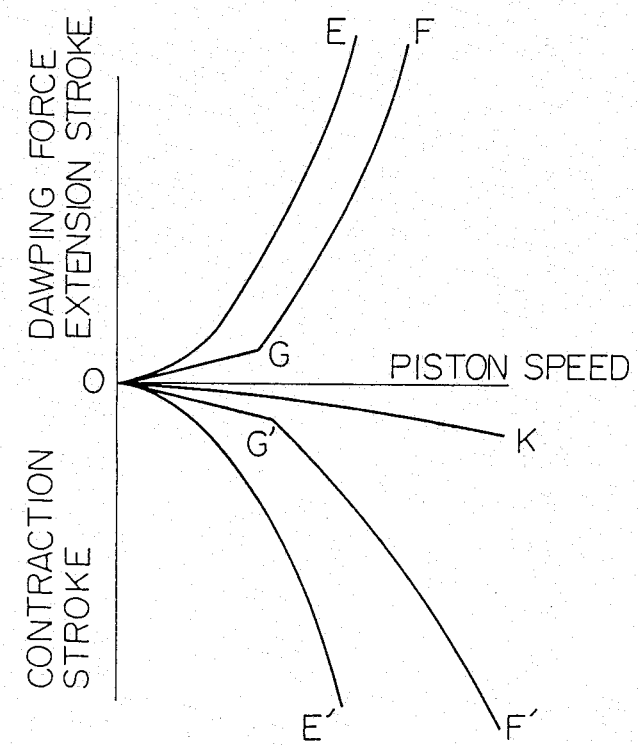
FIG. 2 is a diagram showing the relationship between damping force and piston speed.

It will be understood that FIG. 2 shows relatively sharp corners at points G and G'. However, in transient conditions, the annular clearances between the outer circumferential portions of discs 26 and 25 and the portion 28B of the restricting member 28 and the portion 27B of the restricting member 27 respectively gradually decrease to zero and the liquid flow is restricted by such clearances. Thus, sharp corners at G and G' are not observed actually.

It will further be understood that the characteristics shown in FIG. 2 can be changed as desired by suitably determining the configuration of cut out 25A or 26A, the clearance $l_1$ or $l_2$ between the disc 25 or 26 and short portion of 27B or 28B of restricting member 27 or 28, the inner diameter of annular projection 30 or 31, and the resiliency or the number of mutually overlapping sheets of the disc 25 or 26. Although the discs 25 and 26 each are shown as 1 single sheet, the discs may, according to conventional technique, consist of two or more mutually overlapping sheets.

Further, the range of free sliding displacement between the piston 23 and the piston rod 21, as shown by the distance between the disc 25 and the projecting portion 30 of the piston 23 in the condition of FIG. 3, may be determined as desired, and within such range the piston rod can freely reciprocate without generating any damping force. Thus, the invention is particularly adapted for use in cases receiving vibrations of low amplitude and high frequency.

Figure 9:
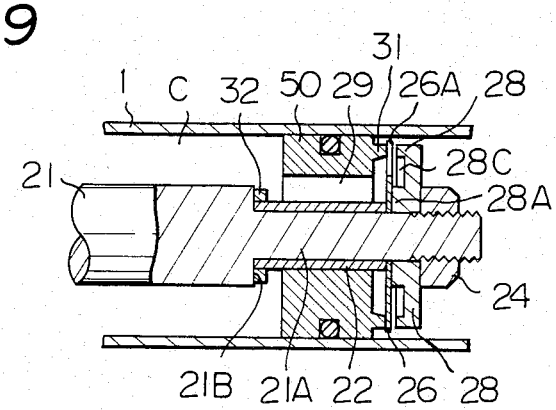
FIG. 9 is a partial sectional view of a second embodiment of the invention.

The damper shown in FIG. 3–FIG. 8 acts to generate damping forces both in extension and contraction strokes, but the invention may also be applied to hydraulic dampers acting on either one only of the extension and contraction strokes. FIG. 9 shows a second embodiment of the invention, wherein the disc 25 and the restricting member 27 in the first embodiment are omitted, and an annular resilient member 32 formed of such as rubber is provided to relieve the impact between the piston and the stepped portion 21B of the piston rod 21 and to prevent the sound from such impact.

The damper shown in FIG. 9 generates a damping force similar to the first embodiment in the extension stroke of the damper and does not generate substantially any damping force in the contraction stroke.

Figure 10:
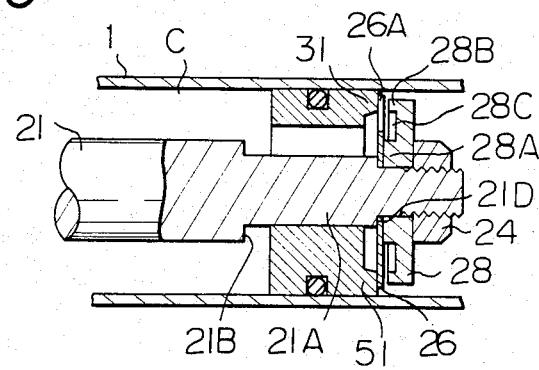
FIG. 10 is a view similar to FIG. 9 but showing a third embodiment of the invention.

FIG. 10 shows another embodiment which is generally similar to the second embodiment of FIG. 9. In FIG. 10, the collar 22 in FIG. 9 is removed and the piston is slidably mounted on the small diameter portion 21A of the piston rod 21, and a stepped portion 21D is formed on the piston rod 21 to locate the resilient disc 26. In FIG. 10, the resilient member 32 is omitted, but when the range of relatively free sliding movement of the piston with respect to the piston rod is large, it is preferable to provide a resilient member similar to the resilient member 32. Further, the projecting portion 31 in FIG. 10 is defined by a counter bore formed in the side surface of the piston. The damper of FIG. 10 operates similarly to the damper of FIG. 9.

Figure 11:
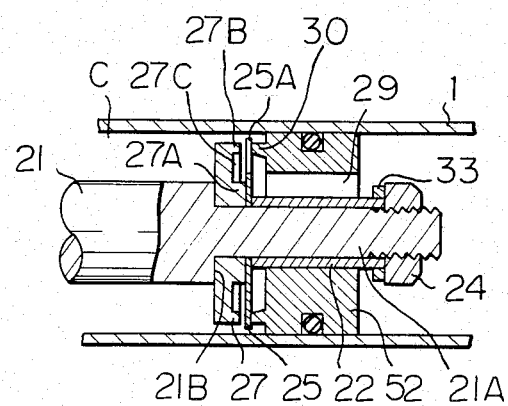
FIG. 11 is a view similar to FIG. 9 but showing a fourth embodiment of the invention.

FIG. 11 shows a fourth embodiment, wherein the damper acts to generate damping force in the contraction stroke and, in the extension stroke, substantially no damping force. Further, in this embodiment, a resilient member 33 similar to the resilient member 32 in FIG. 9 is provided between the nut 24 and the piston.

Figure 12:
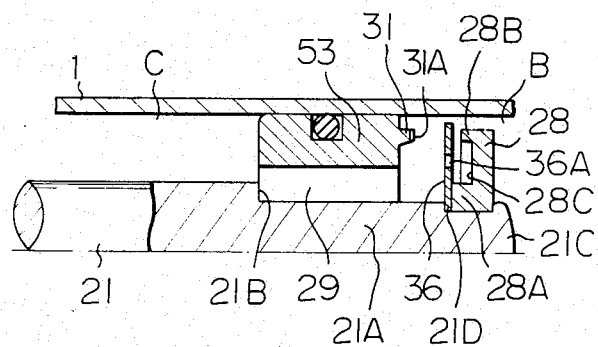
FIG. 12 is a view similar to FIG. 10 but showing a fifth embodiment of the invention.

FIG. 12 shows a fifth embodiment which is generally similar to the embodiment of FIG. 10. The resilient disc 26 in FIG. 10 is replaced by a disc 36 having a through hole 36A which defines an orifice passage in the low speed range for generating the damping force depicted by line OG in FIG. 2, and a radially extending groove 31A is formed in the projecting portion 31 of the piston to define an orifice passage when the disc 36 abuts with the projecting portion 31 for generating the damping force in the high speed range. Further, in FIG. 12, the nut 24 in the preceeding embodiments is omitted and the tip end 21C of the piston rod is deformed, e.g. a swaging process, to integrally mount the disc 36 and the restricting member 28 on the piston rod 21.

According to the invention, the passage 29 formed in the piston permits the liquid to flow in both directions, and thus, the construction of the piston can be simplified. The passage 29 shown in the illustrated embodiments is connected to the central bore of the piston. However, the passage 29 may consist of one or more through holes formed separately from the central bore of the piston.

The invention is not limited to the embodiments described and various changes or modification can easily be achieved by those skilled in the art. For example, the embodiments show single tube type dampers, but the invention can equally be applied to dual tube dampers. The resilient disc illustrated may be replaced by two or more mutually overlapping discs. Further, in the illustrated embodiments, the damping force in the high speed range is defined by an orifice passage having a restricted effective sectional area, but the resilient disc may be arranged to separate from the piston at the high speed range of the piston.

What is claimed is:

1. A hydraulic damper comprising:
a cylinder;
a piston slidably disposed in said cylinder and partitioning the interior thereof into two liquid chambers;
a passage extending through said piston and connecting said two liquid chambers during both extension and contraction strokes of the damper;
a piston rod extending through at least one of said liquid chambers and projecting out of said cylinder;
said piston being mounted on said piston rod for axial displacement relative thereto by a limited amount; and
means for controlling the amount of liquid flow through said passage during at least one of the extension and contraction strokes of the damper, said controlling means comprising a resilient annular disc mounted on said piston rod, said disc having an outer circumferential portion adapted to be contacted by said piston upon relative movement between said piston rod and said piston during a first portion of the extension or contraction stroke of the damper, means defining a first orifice passage from said passage to one said chamber during said first stroke portion, said disc being deflectable by contact of said piston with said outer circumferential portion during a second portion of the stroke of the damper, a restricting member mounted on said piston rod, said outer circumferential portion abutting said restricting member upon deflection of said disc by a predetermined amount, means defining a radially extending second orifice passage from said passage to said one chamber upon abutment of said outer circumferential portion with said restricting member, and said second orifice passage being of smaller size than said first orifice passage.

2. A damper as claimed in claim 1, wherein said disc has formed in said outer circumferential portion thereof a radially extending cutout defining said second orifice passage and a portion of said first orifice passage.

3. A damper as claimed in claim 1, wherein said first orifice passage comprises a through hole in said disc.

4. A damper as claimed in claim 3, wherein said second orifice passage comprises a radial groove formed in said piston.

5. A damper as claimed in claim 1, comprising two said discs fixedly mounted in spaced relationship on said piston rod at positions to be contacted by opposite ends of said piston during respective extension and contraction strokes of the damper.

* * * * *